US008897543B1

(12) United States Patent
Lin et al.

(10) Patent No.: US 8,897,543 B1
(45) Date of Patent: Nov. 25, 2014

(54) BUNDLE ADJUSTMENT BASED ON IMAGE CAPTURE INTERVALS

(75) Inventors: Michael Hongmai Lin, Mountain View, CA (US); Tilman Reinhardt, Woodside, CA (US)

(73) Assignee: Google Inc., Mountain View, CA (US)

( * ) Notice: Subject to any disclaimer, the term of this patent is extended or adjusted under 35 U.S.C. 154(b) by 291 days.

(21) Appl. No.: 13/475,664

(22) Filed: May 18, 2012

(51) Int. Cl.
*G06K 9/00* (2006.01)

(52) U.S. Cl.
USPC ........................................ 382/154

(58) Field of Classification Search
USPC ........................................ 382/154
See application file for complete search history.

(56) References Cited

U.S. PATENT DOCUMENTS

| | | | |
|---|---|---|---|
| 5,825,915 A * | 10/1998 | Michimoto et al. | 382/154 |
| 5,845,006 A * | 12/1998 | Sumi et al. | 382/154 |
| 6,466,255 B1 * | 10/2002 | Kagita et al. | 348/42 |
| 6,674,893 B1 * | 1/2004 | Abe et al. | 382/154 |
| 6,912,293 B1 | 6/2005 | Korobkin | |
| 6,970,593 B2 * | 11/2005 | Furukawa | 382/154 |
| 7,015,951 B1 * | 3/2006 | Yoshigahara et al. | 348/207.99 |
| 7,158,664 B2 * | 1/2007 | Nagaoka et al. | 382/154 |
| 7,193,633 B1 * | 3/2007 | Reinhardt et al. | 345/629 |
| 7,593,552 B2 * | 9/2009 | Higaki et al. | 382/118 |
| 7,720,276 B1 * | 5/2010 | Korobkin | 382/154 |
| 2003/0091228 A1 * | 5/2003 | Nagaoka et al. | 382/154 |
| 2004/0032971 A1 * | 2/2004 | Nagaoka et al. | 382/103 |
| 2005/0094869 A1 * | 5/2005 | Yoda et al. | 382/154 |
| 2005/0128212 A1 | 6/2005 | Edecker et al. | |
| 2005/0212794 A1 | 9/2005 | Furukawa et al. | |
| 2009/0141020 A1 | 6/2009 | Freund et al. | |
| 2009/0144668 A1 * | 6/2009 | Yeh | 715/863 |
| 2009/0179895 A1 | 7/2009 | Zhu et al. | |
| 2009/0244062 A1 | 10/2009 | Steedly et al. | |
| 2009/0274362 A1 * | 11/2009 | Sasakawa et al. | 382/154 |
| 2011/0096083 A1 | 4/2011 | Schultz | |
| 2011/0187716 A1 | 8/2011 | Chen et al. | |
| 2014/0147032 A1 | 5/2014 | Yours et al. | |

* cited by examiner

*Primary Examiner* — Alex Liew

(74) *Attorney, Agent, or Firm* — Dority & Manning, P.A.

(57) ABSTRACT

Methods, systems, and computer program products are provided for determining camera parameters and three dimensional locations of features from a plurality of images of a geographic area. These include, determining a correlation between a pose of a first camera and a pose of a second camera, generating one or more constraints incorporating the correlation, and determining at least one of camera parameters and three dimensional locations of features using a plurality of constraints including the generated one or more constraints. The first camera and the second camera have substantially rigid positions and poses relative to each other. A strength of the correlation is based at least upon a time interval between respective image captures by the first camera and the second camera.

20 Claims, 7 Drawing Sheets

US 8,897,543 B1

BUNDLE ADJUSTMENT BASED ON IMAGE CAPTURE INTERVALS

BACKGROUND

1. Field

This disclosure relates to the bundle adjustment of images.

2. Background

Multiple photographic images of a geographic area may be used to create or update a three-dimensional (3D) representation of the area and of particular structures and other points of interest in that geographic area. For example, oblique imagery of a city area taken from an aircraft may be used to generate a three-dimensional view of city streets, buildings, and other points of interest. In general, multiple images from a set of oblique images overlap an area. In order for these multiple images to be used in generating an accurate representation of the area in 3D, the images are "bundle adjusted." Bundle adjustment is a technique of determining camera parameters for individual images so that the objects in the images are accurately represented in a corresponding 3D representation. Given a set of images depicting a number of 3D points from different viewpoints and initial parameters regarding the cameras acquiring the images, bundle adjustment can be defined as the problem of simultaneously refining the 3D coordinates describing the scene geometry as well as the parameters of the relative motion and the optical characteristics of the cameras, according to an optimality criterion involving the residual error of corresponding image projections of the 3D points.

The quality of the results of the bundle adjustment process, for example, the accuracy of the determined camera parameters and positions of 3D points and other geographic features, depend upon having sufficient features in images based upon which cameras can be related to each other. In some geographic areas, however, such features may not be present. When two cameras are to be related based upon images of an area that has a lack of detectable features, conventional bundle adjustment techniques may be unable to determine accurate camera parameters and 3D point positions.

SUMMARY OF EMBODIMENTS

Disclosed embodiments use the relationship between respective cameras of a group in order to more accurately perform bundle adjustment. Methods, systems, and computer program products are provided for determining camera parameters and three dimensional locations of features from a plurality of images of a geographic area. An embodiment includes, determining a correlation between a pose of a first camera and a pose of a second camera, generating one or more constraints incorporating the correlation, and determining at least one of camera parameters and three dimensional locations of features using a plurality of constraints including the generated one or more constraints. The first camera and the second camera have substantially rigid positions and poses relative to each other. A strength of the correlation is based at least upon a time interval between respective image captures by the first camera and the second camera.

Another embodiment includes, identifying a correlation tying a first camera pose and a second camera pose, determining a strength of the correlation based at least upon a time interval between an image captured by a camera at the first pose at a first time and an image captured by a camera at a second pose at a second time, generating one or more constraints incorporating the correlation as scaled by the determined strength, and determining at least one of camera parameters and three dimensional locations of features using a plurality of constraints including the generated one or more constraints. The correlation may be defined so that the strength decreases as the time interval increases.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

Figure 3A:
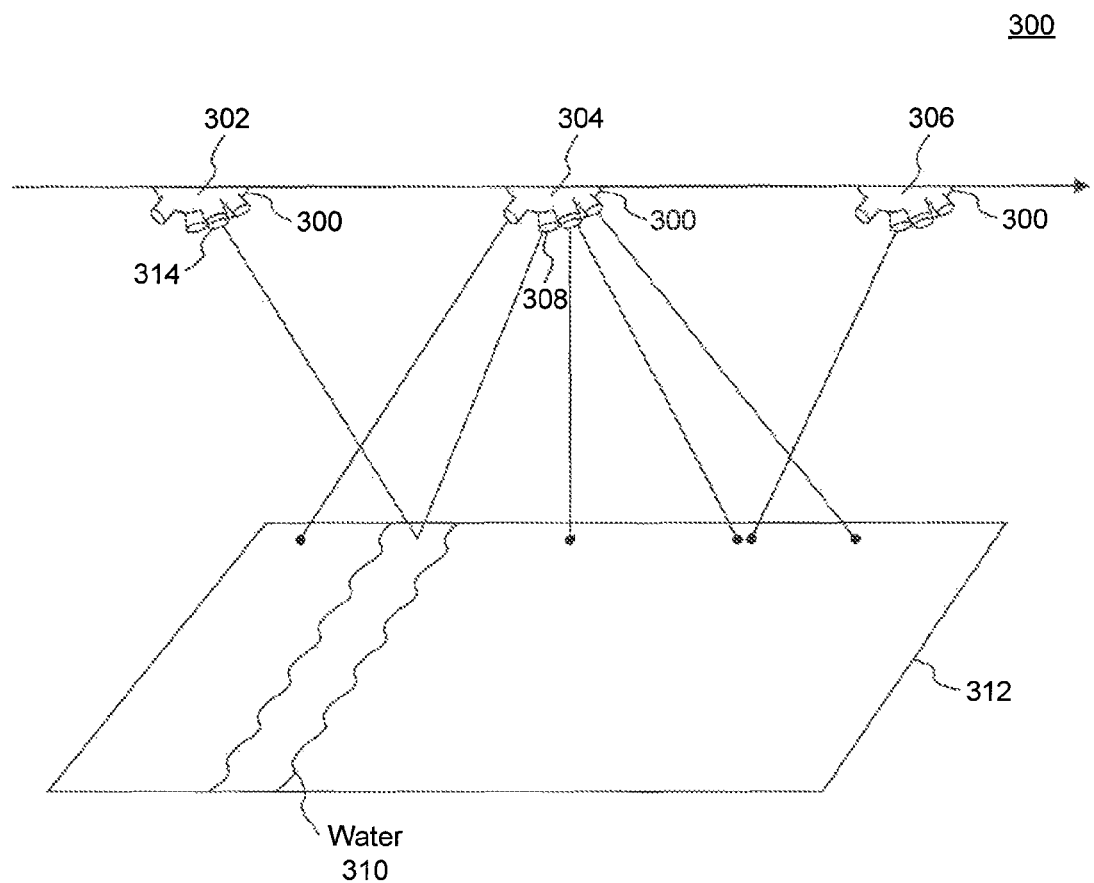
FIG. 3A is a diagram illustrating an environment in which a camera rosette has some cameras pointing to feature-rich areas and at least one camera pointing to feature-less areas.
Figure 3B:
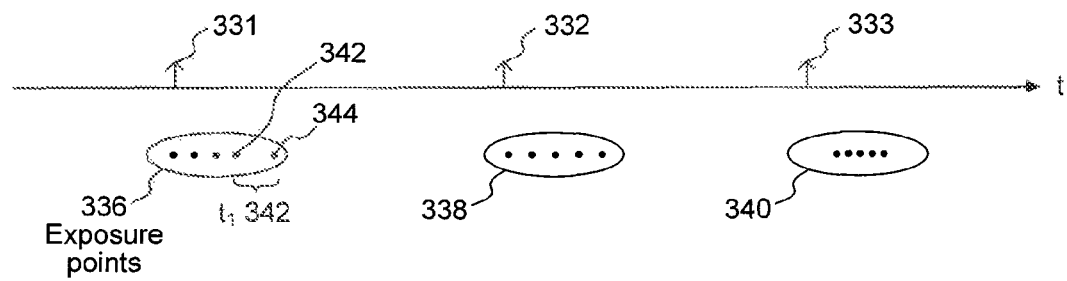

FIG. 3B graphically illustrates exemplary camera exposure points as a function of time, from cameras affixed to a rosette.

Figure 4:
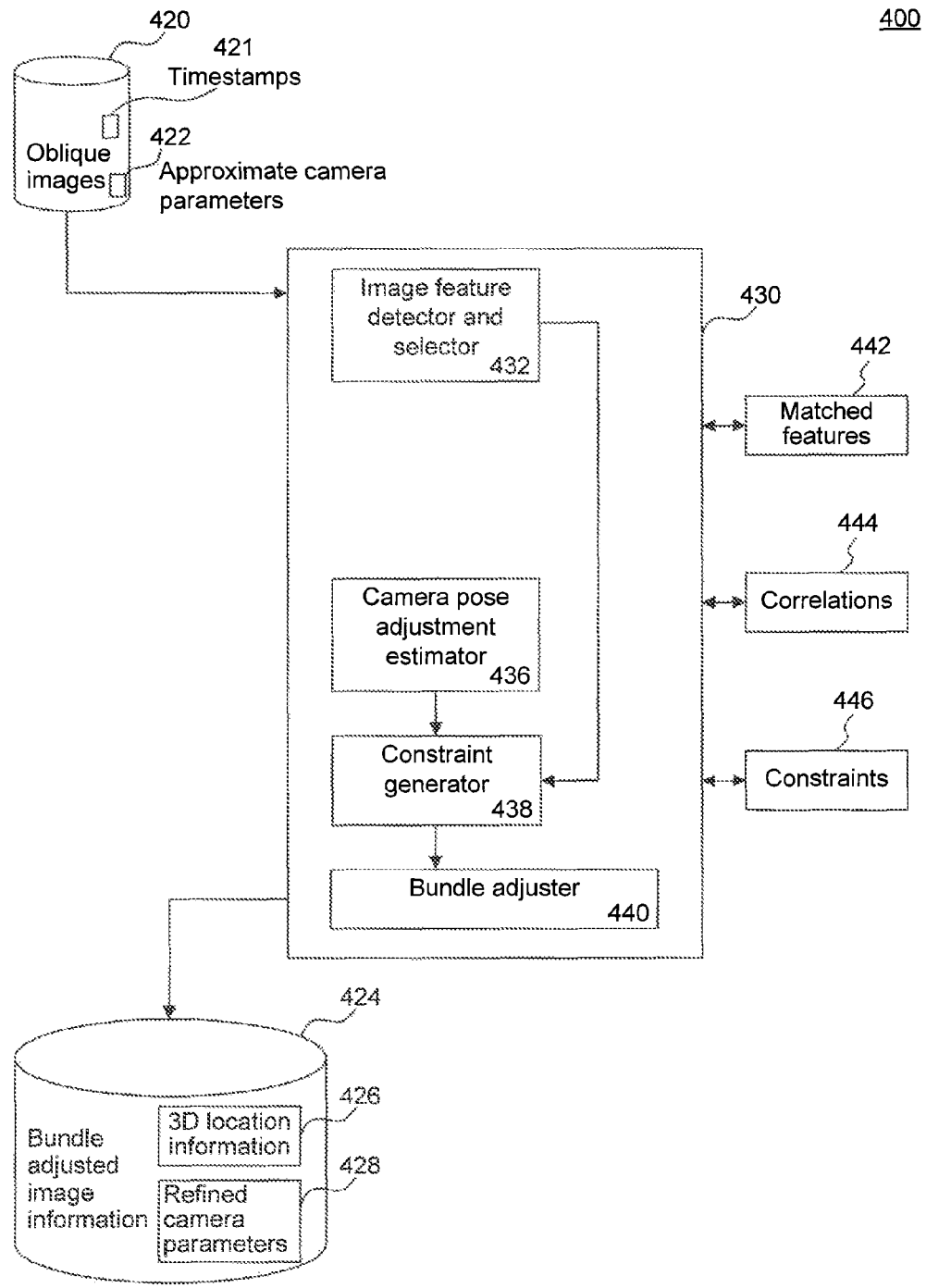

FIG. 4 illustrates a system for bundle adjusting images using image capture intervals, in accordance with an embodiment.

Figure 5:
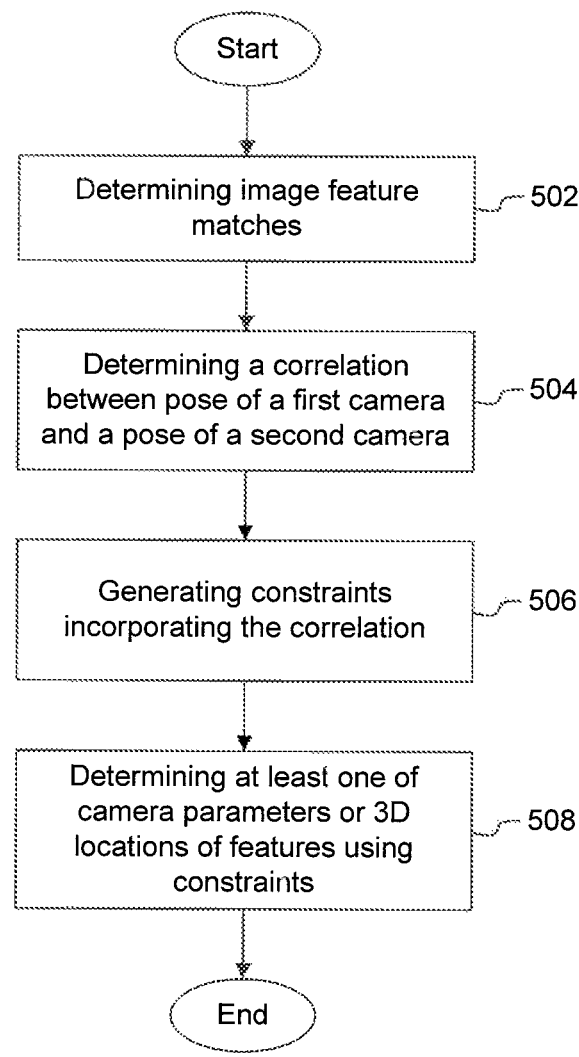

FIG. 5 illustrates a method for bundle adjusting images using image capture intervals, according to an embodiment.

Figure 6:
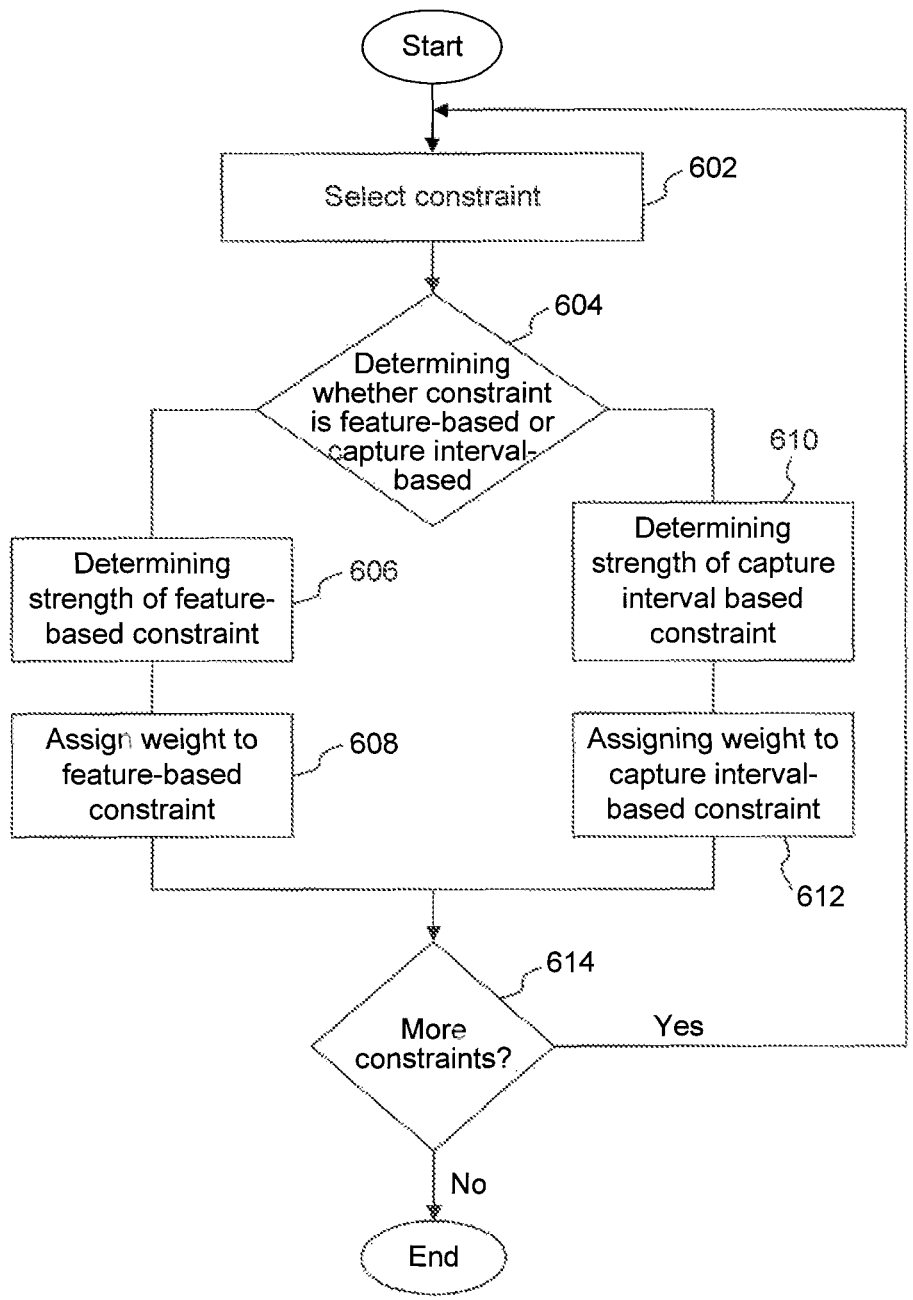

FIG. 6 illustrates a method for prioritizing constraints, according to an embodiment.

Figure 7:
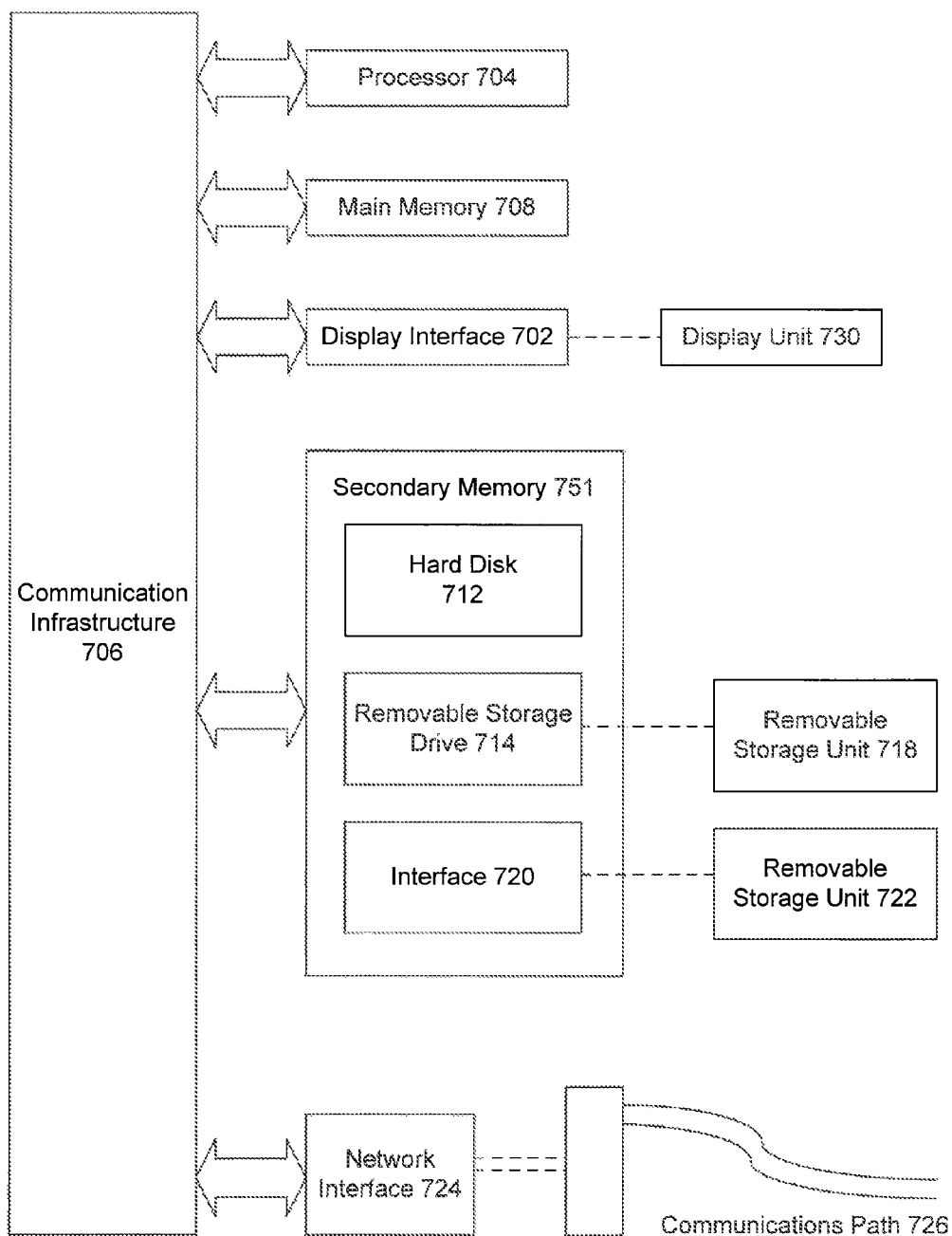

FIG. 7 illustrates an exemplary computer system, in accordance with an embodiment.

DETAILED DESCRIPTION

The present disclosure is generally directed to the bundle adjustment of geographic imagery to determine camera parameters associated with images and 3D positions of points of interest of various objects in the respective images. Bundle adjustment is conventionally used in many applications in many feature-based 3D reconstruction techniques.

Embodiments disclosed herein provide more accurate bundle adjustment using a set of images, particularly where some of the cameras cannot be bundle adjusted based upon features detectable in the images. For example, images of feature-poor areas, such as, bodies of water, may not have sufficient detectable and stable features that can be used to bundle adjust. Thus a camera in a camera rosette that captures an image of a feature-poor area may not be accurately bundle adjusted using that image. When imagery is captured by a moving rosette of N cameras, the poses of the N images in an iteration of image captures are correlated. In embodiments, this correlation is added as extra constraints in a bundle adjustment technique, in order to improve the estimated pose for images that might otherwise be under-constrained. However, for many camera rosettes, neither rigidity with respect to the relative positions of the N cameras nor synchronization of the respective image captures among the N cameras is perfect. Thus, the added constraints are used more to improve pose estimates where the available imagery is feature-poor, and less where feature-rich imagery is available.

Figure 1:
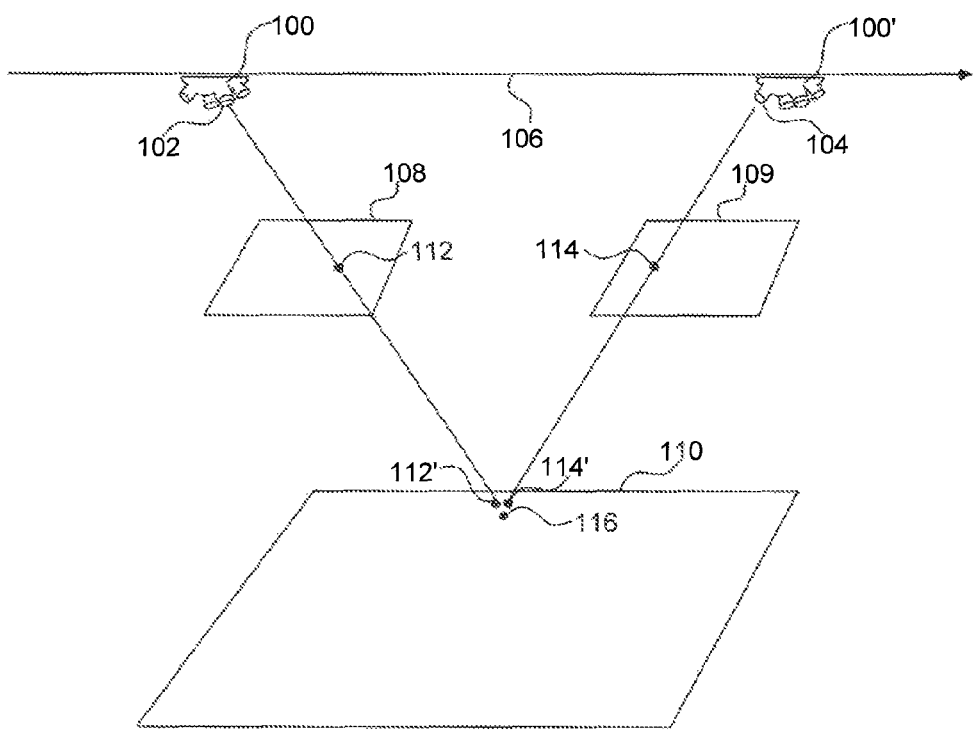
FIG. 1 is a diagram illustrating how oblique imagery of a geographic area is used to determine the 3D position of features or objects represented in the images.

FIG. 1 illustrates an environment in which bundle adjustment may be used. A camera rosette 100 is attached to an airborne platform (not shown) that moves along a path 106. Camera rosette 100 may have a plurality of cameras configured to capture oblique imagery of geographic areas. In some embodiments, rosette 100 may, in addition, include a camera to capture a nadir view of the geographic area. The individual cameras, such as cameras 102 and 104 of rosette 100, have substantially fixed locations and poses relative to each other. Camera rosette 100 captures images 108 and 109 of overlapping areas of geographic area 110 at different locations along a path 106. Image 108 is captured at a first location as illustrated to the left of FIG. 1A using a camera 102 of rosette 100. Subsequently, rosette 100 moves along path 106 and, at a second location 100', captures image 109 using a second camera 104. Feature 116 located in geographic area 110 is represented in images 108 and 109, respectively as features 112 and 114.

With each captured image, such as images 108 and 109, camera parameters associated with the image may be stored. Camera parameters include camera extrinsic parameters, such as position and pose of the camera, and intrinsic parameters, such as principal point location and focal length. However, the camera parameters, as determined by the camera and/or rosette at the time of image capture, may not be accurate due to factors, such as, the movement of the rosette and differences in the firing intervals of respective cameras in the rosette. Herein, the camera parameters determined at the time of image capture are referred to as approximate camera parameters.

When using images 108 and 109 to determine the 3D location of feature 116, features 112 and 114 are projected to the surface 110. However, projecting features onto a surface using the approximate camera parameters determined at the time of image capture, may have the respective features in locations different from the actual observed 3D location of that object. The difference between the predicted location of the object or feature, such as that predicted using the approximate camera parameters, and the actual observed location of the object is referred to as "residual error." Bundle adjustment iteratively improves the predicted locations of features to minimize the residual error of the represented features, and accordingly determines refined camera parameters associated with the respective images.

Figure 2A:
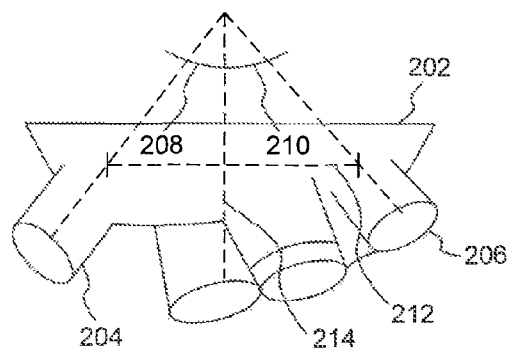
FIG. 2A illustrates a camera rosette and the relative positions and poses of the cameras in the rosette, in accordance with an embodiment.

FIG. 2A illustrates a camera rosette and the relative positions and poses of the rosette's cameras, in accordance with an embodiment. FIG. 2A illustrates a camera rosette 202 having a plurality of cameras. A person of skill in the art would understand that a camera rosette may have any number of cameras that are respectively configured in various positions and poses. The relative position and pose of any one of the cameras in the rosette may be specified as rigid or substantially rigid with respect to another camera in that rosette. For example, cameras in rosette 202 are fixed relative to each other. In another embodiment, however, relatively small variations may occur in the position and/or pose of a camera in relation to other cameras in the rosette. Cameras 204 and 206 of rosette 202 have a distance 212 with respect to each other. In some embodiments, the position of a camera may be specified based upon a direction and distance from the axis 214 of the rosette. The pose of a camera may be specified relative to the axis of the rosette. As shown in FIG. 2A, the pose of camera 204 may be specified by angle 208, and the pose of camera 206 may be specified by angle 210. Thus, the position and pose of the cameras in a rosette may be specified as a defined numeric value with respect to each other.

Figure 2B:
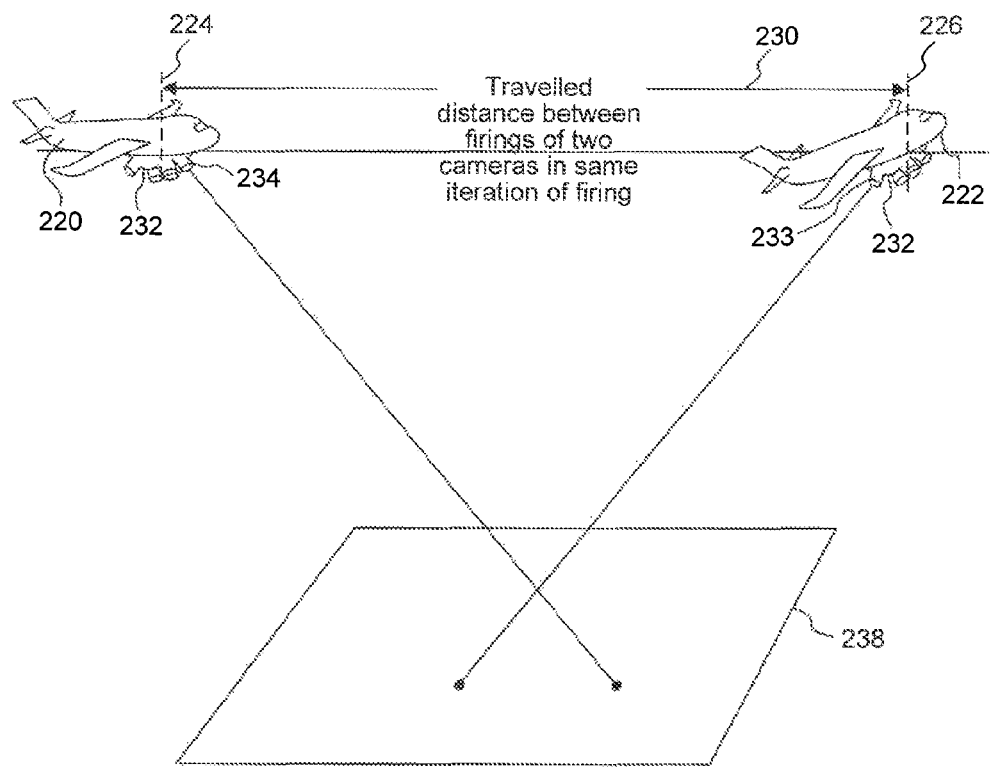
FIG. 2B illustrates an example of how the pose of a camera may change, in accordance with an embodiment.

FIG. 2B illustrates an example of how the pose of a camera may change, in accordance with an embodiment. FIG. 2B illustrates a rosette 232 attached to a moving platform, such as an aircraft 220. Aircraft 220 moves a distance 230 between points 224 and 226. Aircraft 220 may move from position 224 to position 226 during a single iteration of image capturing by the respective cameras of rosette 232. For example, an image capture of geographic area 238 by camera 234 may occur when aircraft 220 is at position 224, and the next image capture of the same iteration, by camera 233, may occur after a time interval during which aircraft 220 moved from 224 to 226. Thus, although the relative positions and poses of the cameras in rosette 232 are fixed, as illustrated in FIG. 2B, between the firing of cameras 234 and 233 in the same iteration of image captures, the actual position and pose of rosette 232, and therefore its individual cameras, may change. As illustrated in FIG. 2B, in addition to the change in the position of rosette 232, aircraft 220 may tilt, roll, or perform some other motion which results in the pose of rosette 232 changing relative to its pose at position 224. Therefore, in embodiments, constraints to the bundle adjusting are formed so as to accommodate changes in position and pose of respective cameras of a rosette even when considering images from the same iteration of image captures.

FIG. 3A is a diagram 300 illustrating an environment in which a camera rosette has some cameras capturing feature-rich areas and at least one camera capturing a feature-poor area. FIG. 3A illustrates a rosette 301 moving through positions 302, 304, and 306 as time progresses. Camera 308, when rosette 301 is at position 304, and camera 314, when rosette 301 is at position 302, capture images of a body of water 310 in a geographic area 312. Because body of water 310 may lack detectable and stable features, it may not be possible to reliably adjust cameras 308 and 314 using the captured images. In such events, embodiments disclosed herein may be used to determine adjustments to one or both cameras 308 and 314 based upon adjustments made to the other cameras in rosette 301, when the rosette is located at the respective positions. For example, the other cameras in rosette 301, at the respective positions, may capture imagery of feature-rich areas of areas 312 that can be used to determine respective adjustments. The adjustments determined for those cameras can then be leveraged to determine the adjustments to cameras of the rosette, such as, for example, camera 314, that does not have imagery with detectable and stable features for bundle adjusting.

FIG. 3B graphically illustrates exemplary exposure points as a function of time, from cameras affixed to one rosette. FIG. 3A illustrates that a camera rosette moves through points 331, 332 and 333 as time increases. At each of the points 331, 332, and 333, the rosette captures images from each of its cameras, and the respective sets of exposure points 336, 338, and 340 are shown in the figure. Each set of exposure points 336, 338, and 340, includes 5 points in the illustrated embodiment, with each point representing the capture of an image by a respective camera in the rosette. Each exposure point in set 336, for example, corresponds to a timestamp associated with an image captured in a single iteration. As illustrated graphically, the five cameras in the rosette may or may not fire (i.e., activate to capture an image) simultaneously to capture the respective images. In 338, the first four cameras fired at substantially regular intervals, but the fifth camera fired after an extended time interval 342. Time interval 342 is the interval between capture of images by the fourth camera at 342 and by the fifth camera at 344. The interval between successive camera firings in the same iteration of image captures by a rosette, such as time interval 342, may be small compared to the time elapsed between two successive iterations of firings. In 338, all cameras in the rosette fired at regular intervals. In 340, all cameras in the rosette fired substantially simultaneously.

FIG. 4 illustrates a system 400 for bundle adjusting based upon image capture intervals, in accordance with an embodiment. System 400 comprises a image capture interval bundle adjuster 430 that operates to determine additional constraints based upon image capture intervals between cameras of the same rosette. These constraints are then resolved in a bundle adjustment with other image feature based constraints to determine adjustments for camera parameters and/or 3D positions of various features in the images. Image capture interval bundle adjuster 430 may comprise an image feature detector and selector 432, a camera pose adjustment estimator 436, a constraint generator 438, and a bundle adjuster 440. Image capture interval bundle adjuster 430 may generate and/or otherwise access matched features 442, camera correlations 444, and generated constraints 446 during its processing.

Feature detector and selector 432 operates to detect image features in input images. According to an embodiment, the input images may be from a database of oblique images 420. The oblique images may have been obtained using a camera rosette attached to an aircraft. The images may, for example, cover a geographic area such as a large city. Each of the oblique images may be associated with at least a timestamp 421 indicating the time of image capture (e.g., corresponding exposure point) and the camera which captures the image. In addition to the oblique images, the input to the image capture interval bundle adjuster 430 may include approximate camera parameters 422, such as, but not limited to, the pose and position of each camera. Approximate camera parameters 422 may be recorded by the camera rosette and/or camera at the time of capture of the respective images. The approximate camera parameters, may include inaccuracies due to reasons, such as, the movement of the camera rosette and the variations in capture times between the cameras in the same rosette.

The output of image capture interval bundle adjuster 430 may be bundle adjusted image information 424. Bundle adjusted image information 424 includes the calculated 3D locations of objects information 426 and refined camera parameters 428. The calculated 3D location of objects information 426 includes the location of 3D objects represented in the input oblique images as they are adjusted by the bundle adjustment process. Refined camera parameters 428 may include approximate camera parameters 422 after they have been processed through bundle adjustment.

Feature detector and selector 432 may detect any number of features in each image. Feature detection may be based upon any conventional or new technique. An exemplary feature detection technique is a conventional technique referred to as scale invariant feature (SIFT) detector. Detected features may be processed and/or matched with other features to select a set of features from each image to be used in the bundle adjustment process. Matched features 442, produced by image feature detector and selector 432, may be used in bundle adjusting. In various embodiments, all of the matched features, or any subset of the matched features may be used in bundle adjusting.

Camera pose adjustment estimator 436 operates to determine correlations 444 between a pose of a first camera and a pose of a second camera of the same rosette. The correlations may be based upon one or more of relative positions of the cameras, the relative poses of the cameras and the time interval between the firing of the cameras. Correlations 444 based upon the fixed relative positions and poses of the cameras in a rosette may be adjusted to accommodate effects of movements of the rosette during an image capture iteration.

Constraint generator 438 operates to generate constraints 446 based upon matched image features 442 and also based upon correlations determined by camera pose adjustment estimator 436. If a detected feature is found in two or more images, it may be used to generate one or more constraints that relate the cameras that captured the images. The cameras may be related, for example, based on an initial estimate of the 3D position of the detected feature. The initial estimate may be based upon initial and/or approximate estimates of the parameters of the respective cameras capturing the two or more images, and upon the representation of the feature in the two dimensional images. Constraints based upon correlations between cameras relate cameras and camera characteristics to other cameras in the same rosette. In various embodiments, constraints 446 may be formed as linear or non-linear constraints.

Bundle adjuster 440 operates to take as input the constraints, such as constraints 446 generated by module 438, and to determine the 3D positions of image objects and camera parameters. The input to bundle adjuster 440 may also include oblique images and/or features from the oblique images. Bundle adjuster 440 may use any conventional or other technique to bundle adjust based upon the input images and the constraints that are provided as input. According to an embodiment, a known technique, such as, Levenberg-Marquardt can be used in the bundle adjustment. In contrast to conventional systems, disclosed embodiments improve the accuracy of the bundle adjustment by enhancing the constraints to be resolved so that even some of the cameras for which insufficient constraints are available from image features can be accurately adjusted.

FIG. 5 illustrates a flowchart of a method 500 to perform bundle adjustment using image capture intervals, according to an embodiment. Method 500 can be used, for example, in image capture interval bundle adjuster 430 to generate bundle adjusted image information 424 including refined camera parameters 428 and adjusted 3D location information 426. Method 500 may not require all of the steps 502-508 and may not require that the steps 502-508 are performed in the order shown.

Bundle adjustment amounts to jointly refining a set of initial camera parameters and 3D point estimates for finding the set of camera parameters that most accurately predict the locations of the observed 3D points in the set of available images. Although bundle adjustment is to some degree tolerant of missing image projections and missing camera parameter estimates, its accuracy can be improved by providing a more complete set of camera parameters and 3D point estimates. Steps 502-506 operate to provide a more complete set of parameters and point estimates descriptive of the environment to the bundle adjusting. Step 508 performs the bundle adjustment based upon the more complete set of parameters and point estimates.

At step 502, image features are detected. According to an embodiment, a plurality of digital images of a geographic area is input to the image feature detection. The images may be oblique imagery of any large geographic area, captured from an aircraft. For any image in the plurality of images, there may be one or more other images that at least partially overlaps with the image.

The feature detection may be performed using any conventional or other feature detection technique. The detected features may include, but are not limited to, edges, points, blobs and ridges. Corresponding features among separate images are compared to determine whether they may represent the same feature in the geographic area. The images that are compared may be captured from different poses and distances from the respective features. The features in separate images that represent the same geographic feature may be referred to as "matching features." Matching features may be determined using any feature matching technique such as, but not limited to, edge matching, contour matching, or object recognition technique. Some or all the matched features may be selected for input to the bundle adjustment.

At step 504, correlations between cameras are determined. The correlations are based at least upon the physical relationship of respective cameras within a structure, such as, for example, a camera rosette. For example, any two of the cameras of rosette 202 shown in FIG. 2A may be correlated due to their substantially fixed positions and poses relative to each other. The distance 212 between two cameras 204 and 206 in a rosette 202 remains substantially fixed. Likewise, the poses of cameras 204 and 206, indicated by angles 208 and 210 with the axis of the rosette remains substantially fixed in relation to each other. Although the position and pose of cameras in a rosette may be fixed relative to each other, imperfect synchronization in the firing of cameras in a single iteration of image captures by the rosette may lead to changes in the positions and poses of the cameras even when considering a single iteration of image captures. The synchronization of the firing of the respective cameras of a rosette may vary with respect to each other within some threshold.

According to embodiments, the correlations are assigned a strength to indicate the reliability of the correlation to be used in estimating camera parameters. For example, a higher strength value for a correlation between a first and second camera indicates that the pose and/or position of the first camera may be used with a high degree of certainty in estimating the pose and/or position of the second camera. The strength may be specified as a numerical value in a configurable range.

The strength of a correlation, according to some embodiments, may be determined based upon the elapsed time between the firing of the first camera and the second camera. According to some embodiments, the strength is a decreasing function of the duration of the time interval between the firing of the first and second cameras. Cameras in the rosette may not all fire simultaneously, and may instead fire at different times within a short intervals. When the duration of the time interval is small, the strength of the correlation between the cameras is strong; and when the duration is long, the strength of the correlation is set to a weaker value.

At step 506, constraints are generated. At least some of the generated constraints incorporate the correlations between cameras determined as described above. According to an embodiment, the set of constraints includes constraints based upon matched features and constraints based upon correlations of physical characteristics of the cameras and upon image capture intervals.

The constraints based upon matched image features, for example, can relate two or more cameras, from the same or different positions of a rosette, with each other. For example, as illustrated in FIG. 1, cameras 102 and 104 can be related to each other in a constraint based upon their respective views of geographic point 116.

The constraints based upon correlations of physical characteristics of the cameras and upon image capture intervals relate two or more cameras from the same nominal camera rosette position to each other. A constraint may, for example, represent that the position and pose of a second camera may be determined exactly based upon the position and pose of a first camera because the first and second cameras fired almost simultaneously. Another constraint may represent that the position and pose of a third camera may be loosely related within a specified range or threshold to the first camera because the duration of the time interval between the firings of the first and third cameras is relatively long.

The constraints may be specified in various forms including as linear constraints, and/or as non-linear constraints.

At step 508, the determined subset of features are input to be bundle adjusted. According to an embodiment, the bundle adjustment operates to minimize the residual error (also referred to as reprojection error) between the image locations of observed and predicted image points, which is expressed as the sum of squares of a large number of nonlinear, real-valued functions. Thus, the minimization may be achieved using nonlinear least-squares algorithms. According to an embodiment, a known technique, such as Levenberg-Marquardt, can be used for the minimization.

FIG. 6 illustrates a method for prioritizing constraints, according to an embodiment. Method 600, according to an embodiment, operates to ensure that image feature-based constraints are assigned a priority level that is higher that the priority level of camera correlation based on image capture interval-based constraints. Method 600 can be used, for example, in step 506 described above to prioritize the generated constraints. Method 600 may not require all of the steps 602-614 and may not require that the steps 602-614 are performed in the order shown.

At step 602, a constraint is selected from the generated constraints. Constraints may be selected in any order.

At step 604, it is determined whether the selected constraint is derived from a feature match or from a correlation based upon image capture intervals.

If the selected constraint is a feature match constraint, then, optionally at step 606, a strength of the feature match may be determined. For example, feature vectors representing the matched feature in respective images may be compared to determine a strength of the match based upon the degree of similarity between the vectors.

At step 608, arrived at directly from step 604 or after step 606, a weight is assigned to the feature based constraint. According to an embodiment, the weight assigned to a feature-based constraint may be higher than any weight assigned to an image capture interval-based constraint. For example, higher weights may be assigned to feature-based constraints that include a number of features greater than a threshold. In some embodiments, where the feature-based constraint includes less than a threshold number of features, the assigned weight may be lower than the weights assigned at least to some image capture interval-based constraints. Additionally, where an optional strength of the feature match is considered (e.g., step 606), the assigned weight may be proportional to the degree of similarity between the matched features.

If, at step 604, it is determined that the selected constraint is a camera correlation based on image capture interval constraint, then method 600 proceeds to step 610. At step 610, the strength of the correlation represented by the constraint is assessed. As described above, the strength of the correlation between the cameras of the same rosette is based upon the duration of the time interval between the firing of the respective cameras. If the correlation is strong, then at step 612 a higher weight is assigned to the constraint. If the correlation is weak, a lower weight is assigned to the constraint. The strength of the constraint may be determined such that the non-negative strength is a decreasing function of the unsigned duration of the time interval t between the firing of the respective cameras represented in the constraint. For example, the assigned weight may be related to t in accordance with the expression: $a \times [\max\{1-(t/t0)^2, 0\}]^p$, where $a \geq 0$, $t0 > 0$, and $p \geq 1$ are configurable constants. Constant "a" represents a scaling factor corresponding to the type of constraint, and "t0" represents the threshold time interval between the firing of the respective cameras beyond which the firings are considered unrelated (e.g., not considered to be within the same iteration of firing). Constant "p" may be configurable in order to have the above expression approaching an evaluation function of the form $\exp(-t^2)$ or of the form $\max(1-t^2, 0)$. According to an embodiment, the weight may be assigned inversely proportionally to t. According to another embodiment, the weight may decrease exponentially with the duration (e.g., proportional to $\exp(-t)$). In yet another embodiment, the weight may decrease exponentially with the square of the duration (e.g., proportional to $\exp(-t^2)$).

After step 608 or step 612, method 600 proceeds to step 614. At step 614, it is determined whether to continue processing more constraints. If more constraints are to be processed, method 600 proceeds to step 602 to iteratively perform steps 602-614. The determination of whether to process more constraints may be based upon various criteria. According to an embodiment, all generated constraints are processed using method 600. According to another embodiment, a predetermined number of constraints may be processed. In yet other embodiments, a predetermined number of constraints may be processed per camera.

FIG. 7 illustrates an example computer 700 in which the embodiments described herein, or portions thereof, may be implemented as computer-readable code. For example, image capture interval bundle adjuster 430 or any of its modules can be executed on one or more computer systems 700 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 704 may be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme. Computer system 700 may also include display interface 702 and display unit 730.

Computer system 700 also includes a main memory 708, for example, random access memory (RAM), and may also include a secondary memory 710. Secondary memory 710 may include, for example, a hard disk drive 712, and removable storage drive 714. Removable storage drive 714 may include a floppy disk drive, a magnetic tape drive, an optical disk drive, a flash memory drive, or the like. The removable storage drive 714 reads from and/or writes to a removable storage unit 718 in a well-known manner. Removable storage unit 718 may include a floppy disk, magnetic tape, optical disk, flash memory drive, etc. which is read by and written to by removable storage drive 714. As will be appreciated by persons skilled in the relevant art, removable storage unit 718 includes a computer readable storage medium having stored thereon computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 718, removable storage unit 722, and a hard disk installed in hard disk drive 712. Computer storage medium and computer readable storage medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement the embodiments described herein. In particular, the computer programs, when executed, enable processor device 704 to implement the processes of the embodiments, such as the stages in the methods illustrated by flowcharts of FIGS. 5-6, described above. Accordingly, such computer programs represent controllers of computer system 700. Where an embodiment is implemented using software, the software may be stored in a computer storage medium and loaded into computer system 700 using removable storage drive 714, interface 720, and hard disk drive 712, or communications interface 724.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of determining at least one of camera parameters and three dimensional locations of features in images from a plurality of images of an area, comprising:
   determining a correlation between a pose of a first camera and a pose of a second camera, wherein a strength of the correlation is based at least upon a time difference between respective image captures by the first camera and the second camera, and wherein positions and poses of the first camera and the second camera are substantially rigid relative to each other;
   generating one or more constraints incorporating the correlation; and
   determining at least one of camera parameters and three dimensional locations of features using a plurality of constraints including the generated one or more constraints.

2. The method of claim 1, wherein the determining a correlation comprises:
   determining the strength of the correlation, wherein the strength is a decreasing function of a duration of the time difference.

3. The method of claim 1, wherein the correlation is defined at least in part by data indicating an arrangement of the cameras in a camera rosette when the images were captured.

4. The method of claim 3, further comprising:
   receiving position and timestamp information for each of the plurality of images captured by cameras in the camera rosette from an airborne platform.

5. The method of claim 4, wherein the respective image captures by the first camera and the second camera occur in one iteration of image captures by cameras in the camera rosette.

6. The method of claim 4, wherein the respective image captures by the first camera and the second camera occur with the camera rosette at different positions in a path of the airborne platform.

7. The method of claim 1, wherein the first and second cameras are configured to acquire oblique imagery.

8. The method of claim 1, wherein the generating one or more constraints comprises:
   forming one or more constraints relating the pose of the second camera to the first camera.

9. The method of claim 1, wherein the generating one or more constraints comprises:
   forming one or more constraints relating the time difference to an estimated pose adjustment.

10. The method of claim 1, wherein the determining at least one of camera parameters and three dimensional locations of features comprises:
    determining a pose adjustment for the first camera.

11. The method of claim 10, wherein the determining at least one of camera parameters and three dimensional locations of features further comprises:
    determining a three dimensional location of one or more features corresponding to the determined pose adjustment for the first camera.

12. The method of claim 1, wherein the generating one or more constraints include:
    prioritizing each of the generated one or more constraints based upon a corresponding image capture interval.

13. The method of claim 12, wherein the prioritizing includes:
    weighting constraints of the plurality of constraints, wherein the generated one or more constraints are assigned lower weights relative to a portion of the constraints that are based upon feature matching.

14. The method of claim 12, wherein ones of the generated one or more constraints are assigned lower weights relative to a portion of the constraints that are based upon feature matching and wherein a number of features to be matched exceeds a threshold.

15. A system for determining at least one of camera parameters and three dimensional locations of features in images from a plurality of images of an area, comprising:
    at least one processor;
    a camera pose adjustment estimator configured to be executed by the processor and further configured to determine a correlation between a pose of a first camera and a pose of a second camera, wherein a strength of the correlation is based at least upon a time difference between respective image captures by the first camera and the second camera, and wherein positions and poses of the first camera and the second camera are substantially rigid relative to each other;

a constraint generator configured to be executed by the processor and further configured to generate one or more constraints incorporating the correlation; and a bundle adjuster configured to be executed by the processor and further configured to determine at least one of camera parameters and three dimensional locations of features using a plurality of constraints including the generated one or more constraints.

16. The system of claim 15, further comprising:

a camera rosette comprising a plurality of cameras and controlled by the at least one processor, wherein the plurality of cameras includes the first and second cameras.

17. The system of claim 15, wherein the camera pose adjustment estimator is further configured to determine the strength of the correlation, wherein the strength is a decreasing function of a duration of the time difference.

18. The system of claim 15, wherein the constraint generator is further configured to prioritize each of the one or more constraints based upon characteristics of one or more images.

19. A non-transitory computer readable storage medium having instructions stored thereon that, when executed by a processor, cause the processor to perform a method of determining camera parameters and three dimensional locations of features from a plurality of images of an area, wherein the method comprises:

identifying a correlation tying a first camera pose and a second camera pose;

determining a strength of the correlation based at least upon a time difference between an image captured by a camera at the first pose at a first time and an image captured by a camera at a second pose at a second time, the correlation defined so that the strength decreases as the time difference increases;

generating one or more constraints incorporating the correlation as scaled by the determined strength; and determining at least one of camera parameters and three dimensional locations of features using a plurality of constraints including the generated one or more constraints.

20. The non-transitory computer readable storage medium of claim 19, wherein the generating one or more constraints include:

prioritizing each of the generated one or more constraints based upon a corresponding image capture interval.

* * * * *